United States Patent
Van Der Velde et al.

(10) Patent No.: US 11,153,773 B2
(45) Date of Patent: Oct. 19, 2021

(54) INTERFERENCE REPORTING

(71) Applicant: Samsung Electronics Co., Ltd, Suwon-si (KR)

(72) Inventors: Himke Van Der Velde, Zwolle (NL); Thomas David Novlan, Dallas, TX (US); Gert Jan Van Lieshout, Apeldoorn (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/565,408

(22) PCT Filed: Apr. 8, 2016

(86) PCT No.: PCT/KR2016/003719
§ 371 (c)(1),
(2) Date: Oct. 9, 2017

(87) PCT Pub. No.: WO2016/163811
PCT Pub. Date: Oct. 13, 2016

(65) Prior Publication Data
US 2018/0124622 A1    May 3, 2018

Related U.S. Application Data

(60) Provisional application No. 62/145,859, filed on Apr. 10, 2015.

(30) Foreign Application Priority Data

Jul. 17, 2015   (GB) ..................... 1512518

(51) Int. Cl.
*H04W 4/00*      (2018.01)
*H04W 24/10*     (2009.01)
(Continued)

(52) U.S. Cl.
CPC ......... *H04W 24/10* (2013.01); *H04B 17/318* (2015.01); *H04B 17/345* (2015.01); *H04W 24/08* (2013.01)

(58) Field of Classification Search
CPC .... H04W 24/10; H04W 24/08; H04B 17/318; H04B 17/345
See application file for complete search history.

(56) References Cited

U.S. PATENT DOCUMENTS 10,306,637 B2 *   5/2019   Fukuta .................. H04W 16/14
10,397,818 B2     8/2019   Choi et al.
(Continued)

FOREIGN PATENT DOCUMENTS

| CN | 101141394 A | 3/2008 |
| CN | 101150825 A | 3/2008 |

(Continued)

OTHER PUBLICATIONS

Supplementary European Search Report dated Jan. 31, 2018 in connection with European Patent Application No. 16 77 6914.
(Continued)

*Primary Examiner* — Clemence S Han

(57) ABSTRACT

A method of operating a mobile device in a wireless communication network, the method comprising measuring interference at the mobile device, determining whether to report the measured interference to the network, and, if it is determine to report the measured interference to the network, transmitting an interference measurement report to the network including an indication of the time interference was measured. Also described is a method of operating a network node in a wireless communication network.

12 Claims, 7 Drawing Sheets

(51) Int. Cl.
*H04B 17/318* (2015.01)
*H04B 17/345* (2015.01)
*H04W 24/08* (2009.01)

(56) References Cited

U.S. PATENT DOCUMENTS

| | | | |
|---|---|---|---|
| 2004/0132410 A1* | 7/2004 | Hundal | H04B 17/0085 |
| | | | 455/67.13 |
| 2004/0141466 A1 | 7/2004 | Kim et al. | |
| 2008/0062865 A1* | 3/2008 | Neugebauer | H04W 88/04 |
| | | | 370/229 |
| 2009/0041002 A1 | 2/2009 | Marinier | |
| 2011/0013533 A1 | 1/2011 | Bennett | |
| 2011/0124356 A1 | 5/2011 | Feng et al. | |
| 2011/0217985 A1 | 9/2011 | Gorokhov | |
| 2012/0134280 A1 | 5/2012 | Rotvold et al. | |
| 2013/0163449 A1* | 6/2013 | Flammer, III | H04W 74/0808 |
| | | | 370/252 |
| 2016/0037363 A1* | 2/2016 | Kairouz | H04W 24/00 |
| | | | 370/252 |
| 2016/0227427 A1* | 8/2016 | Vajapeyam | H04W 72/085 |
| 2016/0338118 A1* | 11/2016 | Vajapeyam | H04B 17/318 |
| 2016/0374092 A1* | 12/2016 | Gao | H04W 72/0486 |
| 2017/0063479 A1* | 3/2017 | Kim | H04W 24/10 |
| 2017/0142746 A1* | 5/2017 | Koorapaty | H04W 16/14 |
| 2017/0238320 A1* | 8/2017 | Fukuta | H04W 16/14 |
| | | | 370/329 |
| 2017/0339588 A1* | 11/2017 | Moon | H04W 88/02 |
| 2017/0339693 A1* | 11/2017 | Cierny | H04W 16/14 |
| 2018/0175975 A1* | 6/2018 | Um | H04L 1/1816 |

FOREIGN PATENT DOCUMENTS

| | | |
|---|---|---|
| CN | 101835191 A | 9/2010 |
| CN | 101841821 A | 9/2010 |
| CN | 103067926 A | 4/2013 |
| CN | 103096368 A | 5/2013 |
| CN | 103139821 A | 6/2013 |
| CN | 103313337 A | 9/2013 |
| CN | 104468068 A | 3/2015 |
| EP | 2007163 A2 | 12/2008 |
| WO | 00/70897 A1 | 11/2000 |
| WO | 2004/100450 A1 | 11/2004 |
| WO | 2013/029325 A1 | 3/2013 |
| WO | 2015/089292 A1 | 6/2015 |
| WO | 2016/077701 A1 | 5/2016 |
| WO | 2016/086985 A1 | 6/2016 |

OTHER PUBLICATIONS

Office Action dated Jan. 19, 2016 in connection with United Kingdom Patent Application No. GB1512518.0.
Office Action dated Jul. 7, 2016 in connection with United Kingdom Patent Application No. GB1512518.0.
Huawei, HiSilicon, "Discussion of hidden node problem of LAA", 3GPP TSG RAN WG1 Ad-hoc Meeting, Mar. 24-26, 2015, 4 pages, R1-151123.
International Search Report dated Jul. 19, 2016 in connection with International Patent Application No. PCT/KR2016/003719.
Written Opinion of the International Searching Authority dated Jul. 19, 2016 in connection with International Patent Application No. PCT/KR2016/003719.
Office Action dated Jul. 3, 2020 in connection with Chinese Patent Application No. 201680021183.2, 36 pages.
Office Action dated Dec. 18, 2020 in connection with Chinese Patent Application No. 201680021183.2, 28 pages.

* cited by examiner

FIG. 6

| Time | Interference |
|------|--------------|
| 1    | 0            |
| 2    | 5            |
| 3    | 4            |
| 4    | 0            |
| 5    | 2            |
| 6    | 3            |
| 7    | 4            |
| 8    | 5            |
| 9    | 0            |
| 10   | 0            |

# INTERFERENCE REPORTING

CROSS-REFERENCE TO RELATED APPLICATIONS AND CLAIM OF PRIORITY

The present application claims priority under 35 U.S.C. § 365 to International Patent Application No. PCT/KR2016/003719 filed on Apr. 8, 2016; U.S. Patent Application No. 62/145,859 filed on Apr. 10, 2015 and United Kingdom Patent Application No. 1512518.0, filed on Jul. 17, 2015, each of which are incorporated herein by reference into the present disclosure as if fully set forth herein.

TECHNICAL FIELD

This invention relates to reporting measured interference at a mobile device in a wireless communication network. In particular, certain embodiments of the present invention relate to reporting measured interference to a base station or access point in the network. Furthermore, certain embodiments of the present invention describe that the base station may determine the existence of a hidden node based on the reported measured interference.

BACKGROUND

Wireless or mobile (cellular) communications networks in which a mobile terminal (UE, such as a mobile handset) communicates via a radio link to a network of base stations or other wireless access points connected to a telecommunications network, have undergone rapid development through a number of generations. The initial deployment of systems using analogue signaling has been superseded by Second Generation (2G) digital systems such as Global System for Mobile communications (GSM), which typically use a radio access technology known as GSM Enhanced Data rates for GSM Evolution Radio Access Network (GERAN), combined with an improved core network.

Second generation systems have themselves been largely replaced by or augmented by Third Generation (3G) digital systems such as the Universal Mobile Telecommunications System (UMTS), which uses a Universal Terrestrial Radio Access Network (UTRAN) radio access technology and a similar core network to GSM. UMTS is specified in standards produced by 3GPP. Third generation standards provide for a greater throughput of data than is provided by second generation systems. This trend is continued with the move towards Fourth Generation (4G) systems.

3GPP design, specify and standardize technologies for mobile wireless communications networks. Specifically, 3GPP produces a series of Technical Reports (TR) and Technical Specifications (TS) that define 3GPP technologies. The focus of 3GPP is currently the specification of standards beyond 3G, and in particular an Evolved Packet System (EPS) offering enhancements over 3G networks, including higher data rates. The set of specifications for the EPS comprises two work items: Systems Architecture Evolution (SAE, concerning the core network) and Long-Term Evolution (LTE concerning the air interface). The first set of EPS specifications were released as 3GPP Release 8 in December 2008. LTE uses an improved radio access technology known as Evolved UTRAN (E-UTRAN), which offers potentially greater capacity and additional features compared with previous standards. SAE provides an improved core network technology referred to as the Evolved Packet Core (EPC). Despite LTE strictly referring only to the air interface, LTE is commonly used to refer to the whole of the EPS, including by 3GPP themselves. LTE is used in this sense in the remainder of this specification, including when referring to LTE enhancements, such as LTE Advanced. LTE is an evolution of UMTS and shares certain high level components and protocols with UMTS. LTE Advanced offers still higher data rates compared to LTE and is defined by 3GPP standards releases from 3GPP Release 10 up to and including 3GPP Release 12. LTE Advanced is considered to be a 4G mobile communication system by the International Telecommunication Union (ITU).

Particular embodiments of the present invention may be implemented within an LTE mobile network (though the present invention may be considered to be applicable to many types of wireless communication network). Therefore, an overview of an LTE network is shown in FIG. 1. The LTE system comprises three high level components: at least one UE 102, the E-UTRAN 104 and the EPC 106. The EPC 106 communicates with Packet Data Networks (PDNs) and servers 108 in the outside world. FIG. 1 shows the key component parts of the EPC 106. It will be appreciated that FIG. 1 is a simplification and a typical implementation of LTE will include further components. In FIG. 1 interfaces between different parts of the LTE system are shown. The double ended arrow indicates the air interface between the UE 102 and the E-UTRAN 104. For the remaining interfaces user data is represented by solid lines and signaling is represented by dashed lines.

The E-UTRAN 104 comprises a single type of component: an eNB (E-UTRAN Node B) which is responsible for handling radio communications between the UE 102 and the EPC 106 across the air interface. An eNB controls UEs 102 in one or more cell. LTE is a cellular system in which the eNBs provide coverage over one or more cells. Typically there is a plurality of eNBs within an LTE system. In general, a UE in LTE communicates with one eNB through one cell at a time.

Key components of the EPC 106 are shown in FIG. 1. It will be appreciated that in an LTE network there may be more than one of each component according to the number of UEs 102, the geographical area of the network and the volume of data to be transported across the network. Data traffic is passed between each eNB and a corresponding Serving Gateway (S-GW) 110 which routes data between the eNB and a PDN Gateway (P-GW) 112. The P-GW 112 is responsible for connecting a UE to one or more servers or PDNs 108 in the outside world. The Mobility Management Entity (MME) 114 controls the high-level operation of the UE 102 through signaling messages exchanged with the UE 102 through the E-UTRAN 104. Each UE is registered with a single MME. There is no direct signaling pathway between the MME 114 and the UE 102 (communication with the UE 102 being across the air interface via the E-UTRAN 104). Signaling messages between the MME 114 and the UE 102 comprise EPS Session Management (ESM) protocol messages controlling the flow of data from the UE to the outside world and EPS Mobility Management (EMM) protocol messages controlling the rerouting of signaling and data flows when the UE 102 moves between eNBs within the E-UTRAN. The MME 114 exchanges signaling traffic with the S-GW 110 to assist with routing data traffic. The MME 114 also communicates with a Home Subscriber Server (HSS) 116 which stores information about users registered with the network.

An increase in consumer demand for wireless broadband data is evident from the fast uptake of LTE across the world. In view of this, and in view of the high cost associated with increasing the capacity of LTE networks, data service suppliers and operators are increasingly studying how to augment those networks. One such method involves using the unlicensed spectrum to compliment the broadband data services. Here, the operators would be able to offload traffic from the licensed spectrum to the unlicensed spectrum, thereby making use of, for example, Wi-Fi (via LTE/Wi-Fi interworking), LTE over unlicensed (LTE-U), or License-Assisted Access (LAA) technology.

In LAA, a primary cell operating in the licensed spectrum is aggregated with a secondary cell operating in the unlicensed spectrum. That is, LAA may allow for centralized scheduling to be performed by the eNB, which also handles carrier selection for UEs under its control. LTE-U can be considered to provide a broader networking solution to that provided by LAA technology; for example by providing a standalone LTE-U solution where only unlicensed frequencies are used in a network which otherwise operates in accordance with a configuration typical of LTE. While the licensed spectrum is used to provide critical information and ensure Quality of Service, the unlicensed spectrum can be leveraged to increase data rate when required. Depending on the requirements of the service provider, the secondary cell can be configured for downlink-only or to for both downlink and uplink; while the primary cell, for example, may be configured for either LTE FDD (Frequency Division Duplex) or LTE TDD (Time Division Duplex).

One intended target behind the development of LAA is the provision of a single global framework which will allow LAA to be operated according to any regional regulatory requirement. Additionally, it is intended that LAA should co-exist with current Wi-Fi technology in a manner which is both effective and fair for current Wi-Fi users, consumers and providers. Similarly, it is desired that LAA networks of different service operators should also effectively and fairly coexist with one another. In view of this, it is desirable that LAA supports various functionalities and provides sufficient configurability to allow for efficient usage across various geographical regions. For example, current European and Japanese regulations mandate the usage of a Listen-Before-Talk (LBT) procedure when operating in the unlicensed spectrum. Therefore, a desired function of LAA may be the use of an LBT protocol to sense carriers and facilitate effective sharing of the unlicensed spectrum.

The LBT procedure is a contention-based protocol which may be described as a mechanism by which an equipment or component (for example, a UE or eNB) applies a clear channel assessment (CCA) check prior to using a channel. By using energy detection (at the bare minimum), the CCA allows the existence of other signals on the channel to be determined. As a result, it can therefore be determined whether or not the channel is clear or occupied. This determination allows for effective data packet transmission between components sharing a network or transmission medium.

As mentioned, LBT may be used in a network operating in the unlicensed spectrum, as may be the case for Wireless Local Area Networks (WLAN) such as those based on IEEE 802.11 standards and so using Wi-Fi. A problem may occur in these networks when a hidden node is present. In this case, a hidden node may be defined as a first node which is visible to a second node (for example, an Access Point, AP) in the WLAN but is not visible to a third node, where the third node is communicating with the second node. This lack of visibility may simply be a result of the nodes being out of range of each other, and so the first node is hidden, or invisible, to the third node (and potentially vice versa). To give an alternative, a hidden node may be caused by being around a corner from a directional beam transmission (that is, the node made be out of the path of the directional beam). The existence of the hidden node may cause problems in the WLAN such as data packet collision and corruption. Regarding the use of LBT in a WLAN, the existence of hidden nodes may result transmissions from one node colliding with LBT transmissions from a hidden node. In these WLAN systems, the hidden node problem has been addressed by introducing Request-To-Send, RTS, and Clear-To-Send, CTS messages exchanged between the relevant transmitting and receiving nodes to avoid packet collisions.

The problem of hidden nodes also exists in an LAA system where LBT is implemented. Here, hidden nodes may result in transmission problems occurring between the eNB and a UE, where the UE is also in communication with another component (the hidden node) which is invisible to the eNB. The result of this may be transmission interference to the UE.

SUMMARY

It is an aim of certain embodiments of the present invention to provide a method for reporting interference measured at a mobile device to a network such that it may be determined whether or not a hidden node exists in the network.

According to a first aspect of the present invention, a method of operating a mobile device in a wireless communication network is provided. The method comprises: measuring interference at the mobile device; determining whether to report the measured interference to the network; and if it is determined to report the measured interference to the network, transmitting an interference measurement report to the network including an indication of the time interference was measured.

In certain embodiments, measuring interference may comprise: measuring interference during a time slot, the interference measurement report indicating the time slot during which interference is measured; or measuring interference during at least time slot within a time period comprising a plurality of time slots.

In certain embodiments, measuring interference may further comprise: for each time slot of a plurality of time slots, measuring interference during the time slot; or for each time period of a plurality of time periods, measuring interference during at least one time slot in the time period.

In certain embodiments, determining whether to report the measured interference may comprise: determining whether to report the measured interference in respect of each time slot during which interference is measured or in respect of each time period within which interference is measured during at least one time slot.

In certain embodiments, an interference measurement report may comprise: an indication of a time slot during which interference is measured; a percentage representing the number of time slots of a plurality of time slots comprising a time period for which a corresponding measure of interference satisfies a certain condition; an indication of a time slot for which a corresponding measure of interference satisfies a certain condition; an indication of a time slot for which a corresponding measure of interference indicates a change in whether a certain condition is satisfied; or an indication of a time slot for which a corresponding measure of interference indicates a change in a preceding measure of interference.

In certain embodiments, the certain condition may be based on the result of a comparison between a measure of interference and an interference threshold.

In certain embodiments, determining whether to report the measured interference may comprise determining to report the measured interference only when the certain condition is satisfied.

In certain embodiments, the interference measurement report may further include an indication of the result of the comparison.

In certain embodiments, in addition to the indication of when the interference was measured, the interference measurement report may further include an indication of the measured interference.

In certain embodiments, the method of the first aspect may further comprise receiving, from the network, a control signal to reconfigure the mobile device in response to the reported interference.

In certain embodiments, the method of the first aspect may further comprise, in response to receiving the control signal, switching the mobile device to a different channel.

In certain embodiments, the method of the first aspect may further comprise: before measuring interference, receiving, from the network, a first measurement configuration request that the mobile device perform interference measurement; wherein the first measurement configuration request may comprise first configuration information; and wherein the mobile device may be arranged to use the first configuration information to configure performing of at least one of: measuring interference, determining to report measured interference, and configuring the interference measurement report.

In certain embodiments, the method of the first aspect may further comprise: receiving, from the network and in response to transmitting an interference measurement report to the network, a second measurement configuration request; wherein the second measurement configuration request may include at least one of: a request to report additional information about previously measured interference; and a request to perform at least one additional interference measurement.

In certain embodiments, the request to perform at least one additional interference measurement may comprise second configuration information; and the second configuration information may indicate, to the mobile device, that at least one of measuring interference, determining whether to report the measured interference, and configuring the interference measurement report is to be performed differently for the at least one additional interference measurement.

In certain embodiments, measuring interference may comprise measuring a Received Signal Strength Indicator, RSSI.

In certain embodiments, the network may be a Long-Term Evolution, LTE, network.

In certain embodiments, the network may be configured to operate using a licensed spectrum and an unlicensed spectrum.

In certain embodiments, the network may be configured to operate using an unlicensed spectrum only.

In certain embodiments, the network may be a wireless local area network, WLAN.

Another aspect of the present invention provides a mobile device arranged to implement the above method.

In accordance with a second aspect of the present invention, a method of operating a network node in a wireless communication network is provided. The method comprises: measuring interference at the network node; receiving an interference measurement report from a mobile device in respect of interference measured at the mobile device; and determining whether to reconfigure the network based on the measured interference and the interference measurement report.

In certain embodiments, the method of the second aspect may further comprise transmitting, to the mobile device, a first measurement configuration request comprising first configuration information including instructions indicating how the mobile device is to measure and report interference.

In certain embodiments, determining whether to reconfigure the network may comprise transmitting, to the mobile device, a second measurement configuration request; wherein the second measurement configuration request may include at least one of: a request to report additional information about the measured interference corresponding to the received interference measurement report; and a request to perform at least one additional interference measurement.

In certain embodiments, determining whether to reconfigure the network may further comprise: receiving an additional interference measurement report from the mobile device in respect of the second measurement request; and determining whether to reconfigure the network based on the received additional interference measurement report.

In certain embodiments, it may be determined to reconfigure the network if a comparison between the measured interference and the interference measurement report indicates that a hidden node exists in the network.

In certain embodiments, reconfiguring the network may comprise: switching a communication channel between the network node and the mobile device; or identifying the hidden node and transmitting control information to the hidden node.

Another aspect of the present invention provides a mobile device in a wireless communication network, the mobile device being arranged: to measure interference; to determine whether to report the measured interference to a network node; and if it is determined to report the measured interference to a network node, to transmit an interference measurement report to the network node including an indication of the time interference was measured.

Another aspect of the present invention provides a network node in a wireless communication network, the network node being arranged: to measure interference; to receive an interference measurement report from a mobile device in respect of interference measured at the mobile device; and to determine whether to reconfigure the network based on the measured interference and the interference measurement report.

Another aspect of the present invention provides a computer program comprising instructions arranged, when executed, to implement a method and/or apparatus in accordance with any one of the above-described aspects. A further aspect provides machine-readable storage storing such a program.

BRIEF DESCRIPTION OF THE DRAWINGS

Embodiments of the invention are further described hereinafter with reference to the accompanying drawings, in which:

FIG. 6 provides an example of interference measurements at different times.

DETAILED DESCRIPTION

Figure 1:
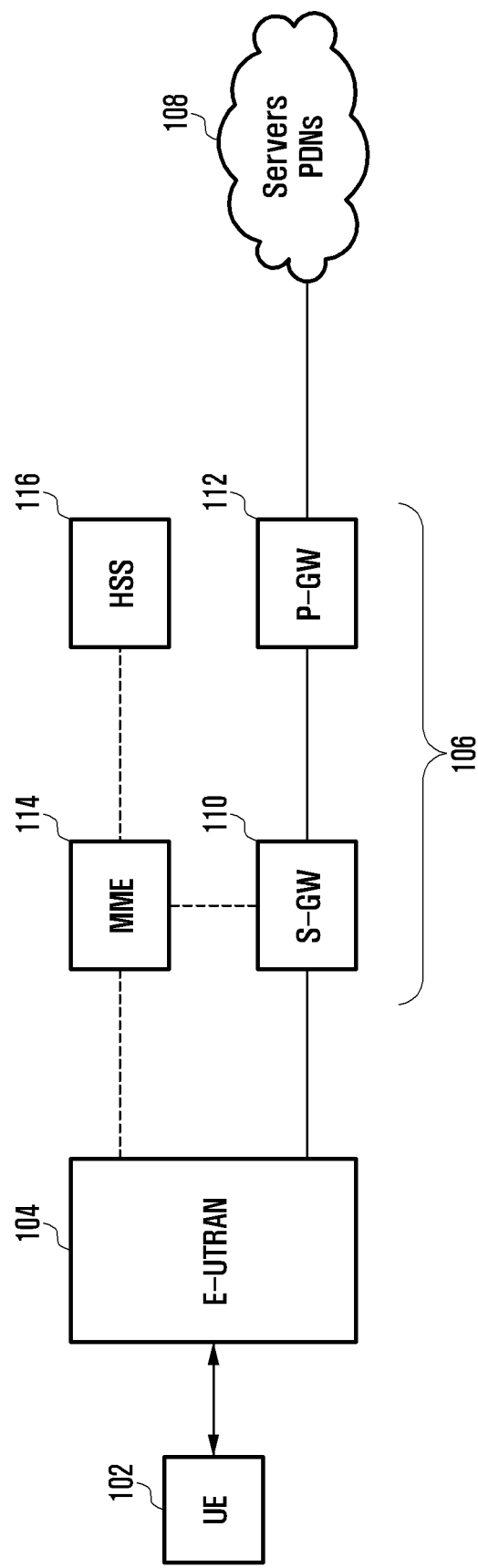
FIG. 1 schematically illustrates an overview of an LTE mobile communication network.

Embodiments of the present invention will now be described in the context of an LTE compliant mobile wireless communications network operating in accordance with the 3GPP LTE standards up to Release-12 and beyond—in particular with a view to Release-13. However, it will be understood that this is by way of example only and that other embodiments may involve other wireless networks, operating at least partially in compliance with other releases and standards. For instance, although there is a difference in radio architecture between LAA systems (which involve LAA technology aggregated with LTE) and WLAN, the skilled person will appreciate that the considerations being applied to an LAA (or LTE-U, for example a standalone LTE-U system where only the unlicensed spectrum is used) system to provide a certain technical effect may also be applied to a WLAN system to provide the same or similar certain technical effect. Furthermore, the skilled person will appreciate that the present invention could also be realised for certain combinations of these technologies. For example, a network involving LAA and WLAN are aggregated with LTE. Therefore, while reference will typically be made to a base station or eNB, the skilled person would appreciate that, depending on the type of network, it may be more appropriate to refer to a router, an access point (AP), or some general network managing transceiver which is configured to connect managed devices to a wider network (such as a telephony network operated by a service operator, or the internet). Furthermore, these considerations should also be taken into account when considering, in the following detailed description, the role of the components referred to as a mobile device or hidden node.

Embodiments of the present invention will now be described in the context of a wireless telecommunication network including a mobile device (for example, user equipment, UE) and a base station (for example, E-UTRAN Node B or eNB). In certain embodiments, the wireless telecommunication network is operated employing an LAA radio access technology. Additionally, an LBT procedure may be implemented in the wireless telecommunication network.

In an LTE network such as that described above, the base station may attempt to communicate with the mobile device. For example, the base station may transmit scheduling information, reference signals for example, a Downlink Reference Signal, DRS or data to the mobile device. Similarly, the mobile device may transmit data or uplink information (for example, a Demodulation Reference Signal) to the base station. In the absence of other nodes (where a node is considered to a connection point, a redistribution point, or an endpoint such as a UE) in the network which are hidden to the mobile device or the base station, both the mobile device and the base station are expected to receive interference at substantially the same moments while the level of interference measured may be different due to differences in path loss to the node causing the interference. However, in a scenario in which there is a node which is hidden from the base station, this may not be the case. In this instance, base station may consider that the interference level at a particular moment in time is negligible, corresponding to a free channel state. However, the mobile device may consider that the interference level at that very same moment in time is non-negligible, corresponding to a channel occupied state. This differing interpretation may cause problems in the transmissions between the components.

The use of LBT is intended to ensure that a node transmits only if the channel is free, however if there is a hidden node in the network then this may not be achieved. That is, for LBT the base station will transmit to the mobile device if the base station has determined that the channel is free (by measuring negligible interference). However, the channel may not, in fact, be free if the mobile device is aware of a transmitting node which is hidden from the base station. In such a case, the base station, although using LBT, may transmit at a time the mobile device is actually experiencing interference and hence may fail to receive the transmission by the base station.

Figure 2:
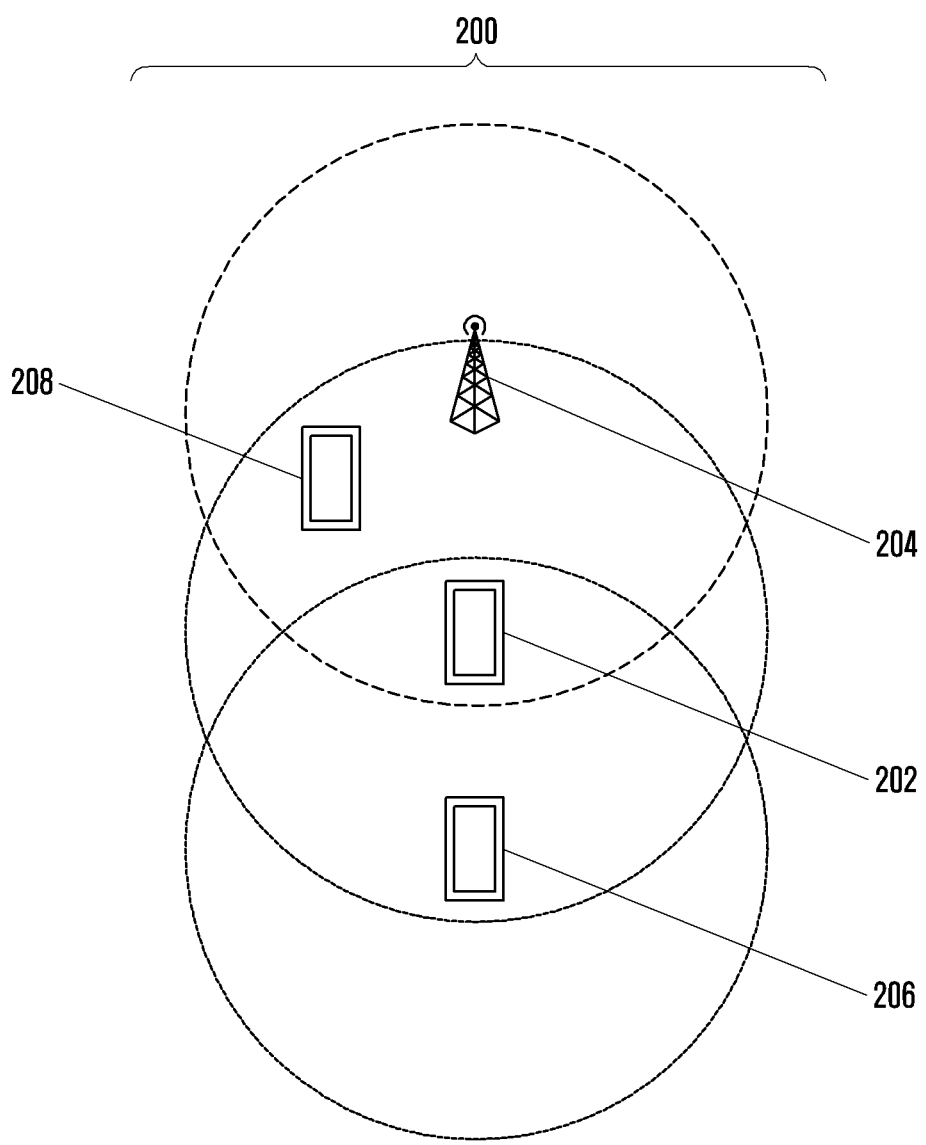
FIG. 2 schematically illustrates a wireless telecommunications network comprising several components.
Figure 3:
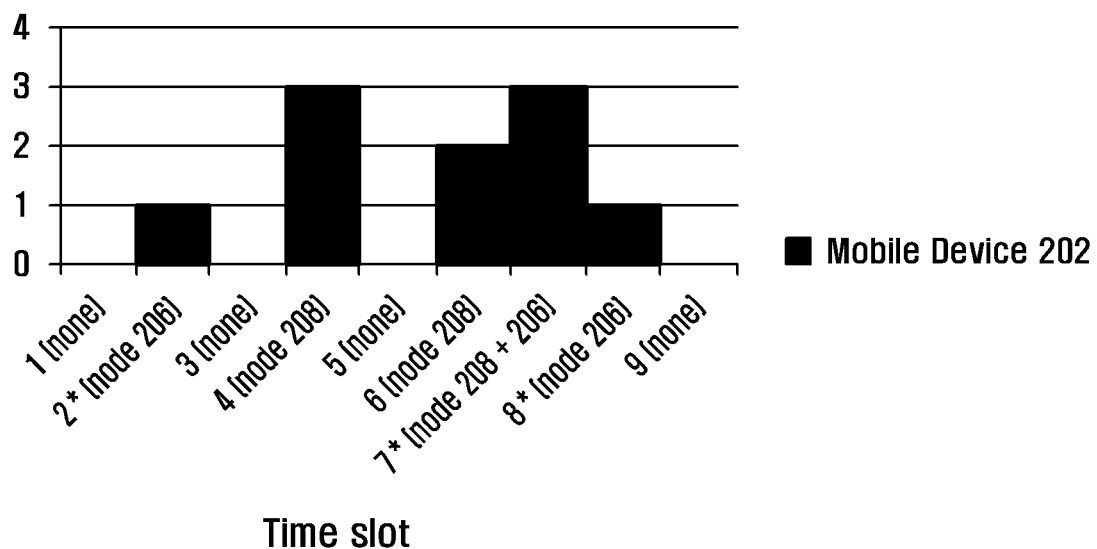
FIG. 3 is a graph illustrating interference detected at different components in a wireless telecommunication network.
Figure 3:
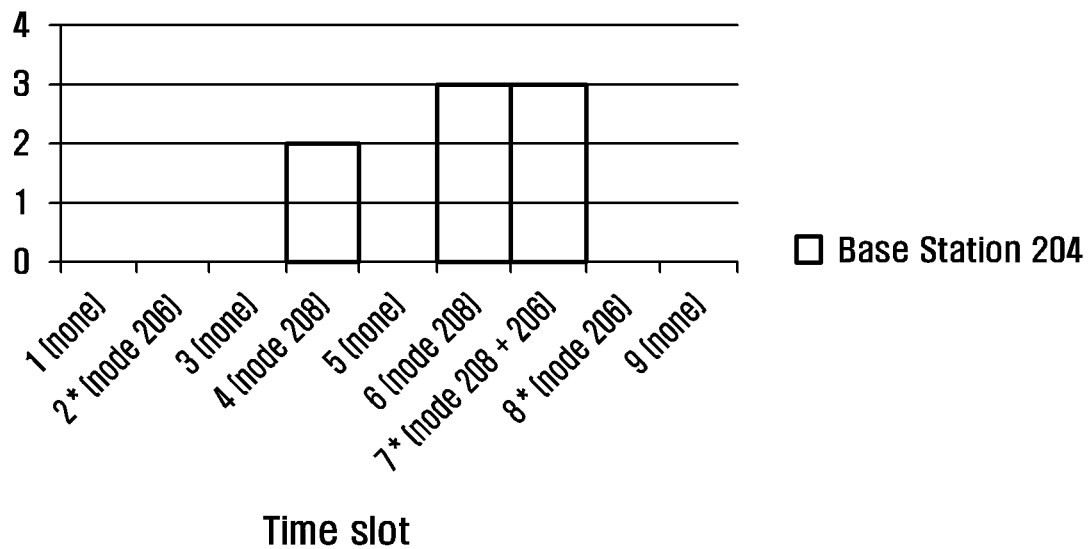

Referring now to FIG. 2 which illustrates the existence of a hidden node in a wireless telecommunication network. In the network 200, a base station 204 is in communication with a mobile device 202. In the figure, a communication range is shown for both the mobile device 202 and the base station 204. It will be appreciated that these communication ranges are for illustration purposes only and are not intended to provide an accurate depiction of a realistic situation. As can be seen, the mobile device 202 is located within communication range of the base station 204, indicating that the base station 204 will be able to transmit to the mobile device 202. Similarly, the base station 204 is located within communication range of the mobile device 202, and so the mobile device 202 will be able to transmit to the base station 204. If no other devices (or nodes) are present, then some degree of similarity between interference at the mobile device 202 and interference at the base station 204 could be expected. This circumstance is illustrated in FIG. 3, wherein relative levels of interference are shown for the mobile device 202 and the base station 204. The situation of no other nodes transmitting is represented by time slots 1, 3, 5 and 9 in FIG. 3, where the level of interference is shown to be effectively zero.

However, in the network 200 it is likely that there are additional nodes. Such a node is illustrated as visible node 208. Visible node 208 is located within the communication range of both the base station 204 and the mobile device 202. As such, visible node 208 can be considered to be visible to the base station 204 (and the mobile device 202) because if node 208 is transmitting then it will be received by both the base station 204 and the mobile device 202. The presence of visible node 208 in the network may result in interference to transmissions between mobile device 202 and base station 204. The situation of visible node 208 interference is also shown in FIG. 3, referring to time slots 4 and 6 and also in time slot 7 where a hidden node 206 is also present. Here, it can be seen that visible node 208 causes the level of interference at the mobile device 202 and the base station 204 to increase. The level of interference detected by a component is influenced by the distance from the component to the interference-causing node. In FIG. 2, visible node 208 is shown in a position which is approximately equidistant from mobile device 202 and base station 204, in which case it could be expected that the level of interference for both is the same. Time slot 4 in FIG. 3 demonstrates the result of the visible node 208 being located closer to the mobile device 202, resulting in the mobile device 202 detecting a greater level of interference than the base station 204. Conversely, time slot 6 demonstrates the result of the visible node 208 being located closer to the base station 204, resulting in the base station 204 detecting a greater level of interference than the mobile device 202. The level of interference detected by, for example, the base station 204 may typically vary from time slot to time slot, depending on the node(s) that is transmitting at that time. It will be appreciated that mobile components and/or nodes in a wireless network are often likely to move around. Consequently, a node for which transmission is not experienced at a first moment T1 by, for example, the base station 204, may be experienced by said base station 204 at a later moment in time T2 i.e. when the concerned node is closer to said base station 204. It is noted that this mobility tends to result in slower changes in detected interference. Nevertheless, it should be noted that, due to node mobility, the presence of hidden nodes may change over time (albeit on a relatively slow time scale).

In addition to visible node 208, FIG. 2 also shows another node 206 (for example, another mobile device). This node is located in such a position that it is within communication range of mobile device 202. However, it is not located within communication range of base station 204. As a result, this node is considered a hidden node 206. That is, the base station 204 is not aware of the presence of hidden node 206, even though mobile device 202 may be aware of transmission from hidden node 206. Such a hidden node 206 may arise from a mobile terminal moving from outside the communication range of mobile device 202 into said range, but remaining outside the communication range of the base station 208. Alternatively, visible node 208 may move within the network 200 such that it is located outside the communication range of base station 204 but still within that of mobile device 202. The effect of hidden node 206 on detected interference is shown in FIG. 3, referring to time slots 2, 7 and 8, where each is further denoted with a "*" to indicate that in these slots the mobile device 202 detects interference which is not detected by the base station 204. Here, it can be seen that a certain level of interference is detected at mobile device 202 while the base station 204 does not detect any interference. Additionally, for time slot 7 visible node 208 and hidden node 206 are both present. Here, even though visible node 208 is closer to the base station 204 than to the mobile device 202, the detected interference is roughly similar due to the influence of the hidden node 208 on the mobile device 202.

A result of the presence of hidden node 206 is that LBT transmissions between the mobile device 202 and the base station 204 may be disrupted. This disruption may have a detrimental effect to an LAA system. That is, transmissions from the base station 204 may collide with those of the hidden node 206 causing the base station 204 transmissions to not be receivable by the mobile device 202.

As described above, the present invention is not limited to LTE systems and the hidden node problem may occur in WLAN systems. In view of this and the on-going evolution of WLAN technology to support orthogonal frequency-division multiple access (OFDMA) schemes and denser networks, the skilled person will readily appreciate how the present invention may be implemented in such evolved WLANs. Furthermore, the skilled person would also realise that the present invention may be applied to standalone LTE-U systems where the unlicensed spectrum is used to carry system and control information which is critical to the operation of the network. In all these cases, the mobile terminal may be configured by the network to perform and report hidden node measurements based on which the network may determine to take action (for example, switching LAA channel).

Figure 4:
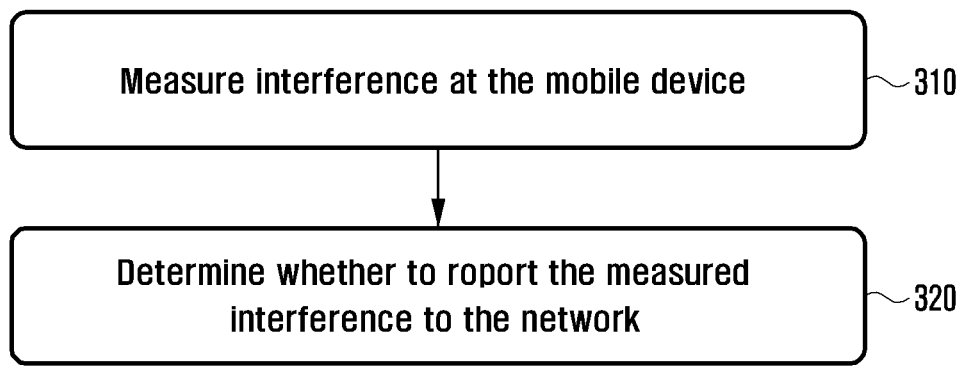
FIG. 4 shows a method in accordance with an embodiment of the present invention.

FIG. 4 shows a method for operating a mobile device in a wireless telecommunications network in accordance with an exemplary embodiment of the present invention. At step 310, the mobile device 202 measures interference at the mobile device 202.

In certain embodiments, measuring interference may refer to measuring the total received power at the mobile device 202. In certain embodiment, measuring interference may include a measurement of the noise at the mobile device 202.

Measuring interference may be accomplished in a variety of conventional ways. To give one example, the mobile device 202 may determine the E-UTRA Carrier Received Signal Strength Indicator (RSSI) at the mobile device 202. The RSSI is defined in 3GPP Specification 36.302 (Section 9.2) as comprising the linear average of the total received power (in Watts [W]) observed only in OFDM symbols containing reference symbols for antenna port 0, in the measurement bandwidth, over N number of resource blocks by the UE (mobile device 202) from all sources, including co-channel serving and non-serving cells, adjacent channel interference, thermal noise etc. The mobile device 202 may then use the result to determine a level of interference at the mobile device 202. In this respect, an RSSI measurement may be a suitable choice because it does not rely on any reference symbols which may (or may not—due to the use of LBT) always be transmitted at regular intervals in the network. Alternatively, the skilled person would appreciate that other measures which are suitable for calculating interference at a mobile device could be used. Here, instead of reporting an RSSI value which concerns the average value over a longer period of time, it is intended that the measurement reported for the purposes of the present invention will provide more-detailed time information by relating to a small unit of time. In certain embodiments, it may be advantageous for the type of measurement performed (for use in measuring interference) to be relatively general purpose such that, in addition to its use in detection of hidden nodes, the same measurement could be used for other purposes (for example, estimated of the channel occupancy/load). Furthermore, the skilled person will understand that the above measurement of interference may not be relative to any specific signal.

In step 320, the mobile device 202 then determines whether or not to report the measured interference to the network 200. In certain embodiments of the present invention, this determination may be made based on the actual measured interference value. In certain other embodiments, this determination may be based on a graded interference value, where the graded value is obtained by performing an operation (for example, quantising) the actual measured interference value. For example, this operation may involve comparing the actual measured interference to a predetermined threshold, and recording a graded interference value indicating that the actual measured interference value is negligible (below threshold) or significant (above threshold).

In certain embodiments of the present invention, the message by which the mobile device 202 reports the measured interference may cover a period comprising several time slots i.e. the short periods for which the UE determines an interference value. The message also indicates when the interference was measured. For example, the message reporting interference may include information regarding the time (or times, in view of interference potentially being measured for a period comprising several time slots) at which the interference was measured. For example, this may be an absolute time (for example, an indication of a specific time slot) at which the interference occurred and was measured or a time relative to some predetermined start point. Alternatively, this time information may indicate, for instance, time periods during which the interference was measured, a proportion of a period of time during which interference was measured or any other form of timing information that could allow the base station 204 to correlate the interference measured by the mobile device 202 with locally measured interference in order to infer the presence of a hidden node. Alternatively, the time information may include an indication of a percentage of a set of time slots for which interference was measured. In this situation, the base station 204 may be aware of the set of time slots (that is, may be aware of the specifics regarding the time slots) and so be able to compare the received percentage with one calculated by the base station 204 itself for the same set of time slots.

In certain embodiments of the present invention, the message by which the mobile device 202 reports the measured interference may cover a time period comprising several time slots—that is, short periods of time for which the mobile device 202 measures interference. In further embodiments, the time period for which the mobile device 202 provides a measurement report may either be a set of consecutive time slots or a series comprising one or more time units for which a measurement is reported followed by several time units for which a measurement is not performed/reported.

In certain embodiments, the message by which the mobile device 202 reports the measured may also comprise an indication of the measured interference. That is, to give a non-limiting example, the message may comprise an actual measured interference value for a time slot or a graded interference value determined from an actual measured interference value for a time slot.

In certain embodiments, it may always be determined to report measured interference to the network 200. As such, in these embodiments it may be useful for the network 200 to have knowledge of the actual RSSI measurements of the mobile device 202. Alternatively, the measured interference may be reported—for each measurement—using a predetermined indicator which indicates the interference level. This predetermined indicator may be based on a grading or a quantisation of the measured interference. For example, the mobile device 202 may assign each measurement one of two values, where one value may correspond to relatively low interference (negligible) and the other value to relatively high interference (significant). The value assigned to each measurement may then be transmitted to the network 200 (along with the relevant time indication), thereby informing the network of the general result without needing to provide detailed RSSI measurement information. In another embodiment, the mobile device 202 may instead only report when the graded value (or predetermined indicator) changes (for instance, from showing significant interference to negligible interference).

In other embodiments, it may only be determined to report the measured interference to the network 200 under certain circumstances. For example, such circumstances for reporting may be when the mobile device 202 has determined that the measured interference is non-negligible. In these embodiments, the network 200 may therefore simply assume that time slots for which nothing is reported (that is, no interference measurements) were those where the mobile device 202 determined it was not necessary to report, for example due to the measured interference being negligible. An advantage of the latter approach is to reduce signaling overhead.

In certain embodiments of the present invention, the network 200 may initially transmit, to the mobile device 202, a request for measuring interference. That is, the act of measuring interference by the mobile device 202 may be triggered as a result of the mobile device 202 having received a request for measuring interference from, for example, the base station 204. As described above, it will be appreciated that this interference measuring may be achieved in a variety of ways, as would be understood by the skilled person. For example, it has been described that the interference can be measured based on an appropriate measurement, for example an RSSI measurement by the mobile device 202. As will be appreciated, this request may be to perform a number of interference measurements over a certain time period, where a determination is then made for each measurement as to whether to report the measurement of not—as detailed above.

However, the skilled person will appreciate that the present invention is not limited to being performed at the request of the network. For example, an alternative implementation may be that measuring (and potentially reporting) interference is performed on a routine basis according to a schedule which has been defined in the mobile device 202. As another alternative, the measuring of interference may be performed as a result of some determination made by the mobile device 202—for example, based on a detection of a change in network, a detection of a reduction in the quality of communications with the network 200, or a detection of an overly-long period of silence from the network 200. In certain embodiments, these triggers or conditions which prompt the mobile device 202 to measure interference may themselves be controlled or specified by the network 200, as may the conditions by which the mobile device 202 will determine to report any measured interference.

In further embodiments, the request for measuring may comprise configuration information, wherein the configuration information is used to configure the mobile device 202 for performing at least one of the measuring of interference, the determining whether to report, and the reporting of the interference itself. That is, the configuration information may include specific instructions or parameters which enable the mobile device 202 to perform the measurements and report the measurements in a manner determined by the network 200. For example, the network 200 may use the request to instruct the mobile terminal to measure interference using RSSI measurements for a time period, where the network 200 may also specify, in the configuration information, the time period itself (for example, by providing information on time slots within the time period for which the measurements should be performed, information on a number of consecutive time slots for which interference should be measured, or information on a number of time periods where, in each time period, interference is measured for at least one time slot defined in the time period). As another example, the network 200 may provide, in the configuration information, a specific interference threshold which is to be used, by the mobile device 202, in determining whether to report the measured interference. As yet another example, the network 200 may instruct, using the configuration information, the mobile device 202 as to what information is to be included in when interference is reported; such as a specific manner for indicating the time corresponding to the measurement, or whether (and how) to include an indication of the interference measurement itself. The configuration information itself may also be an indication that the mobile device 202 should use one of a number of sets of configuration information which are already stored in the mobile device 202. That is, the network 200 does not provide extensive configuration information but rather instructs the mobile device 202 to use configuration settings which are already known to the mobile device 202 (for example, settings which have been previously provided to the mobile device 202 or which were stored in a storage unit of the mobile device 202 by a manufacturer).

However, it will be appreciated that no request for measuring may be transmitted to the mobile device 202 to prompt interference measuring, and so the present invention does not require that the configuration information is provided. For instance, the skilled person will understand the myriad of ways by which the mobile device 202 could have knowledge of or be provided with information indicating how to perform various actions. To give a non-limiting example, the mobile device 202 may comprise one or more sets of information suitable for configuring the mobile device 202 as required (for example, these sets of information may be provided by a manufacturer and stored in a storage unit of the mobile device 202).

As evident from the above, it will be appreciated that reporting the measured interference to the network may actually comprise, in certain embodiments, reporting the measured interference to the base station 204. However, as indicated above the present invention is not limited to LTE networks. For example, in a WLAN the mobile device 202 may measure interference, and report the measured interference to the AP if so determined.

Figure 5:
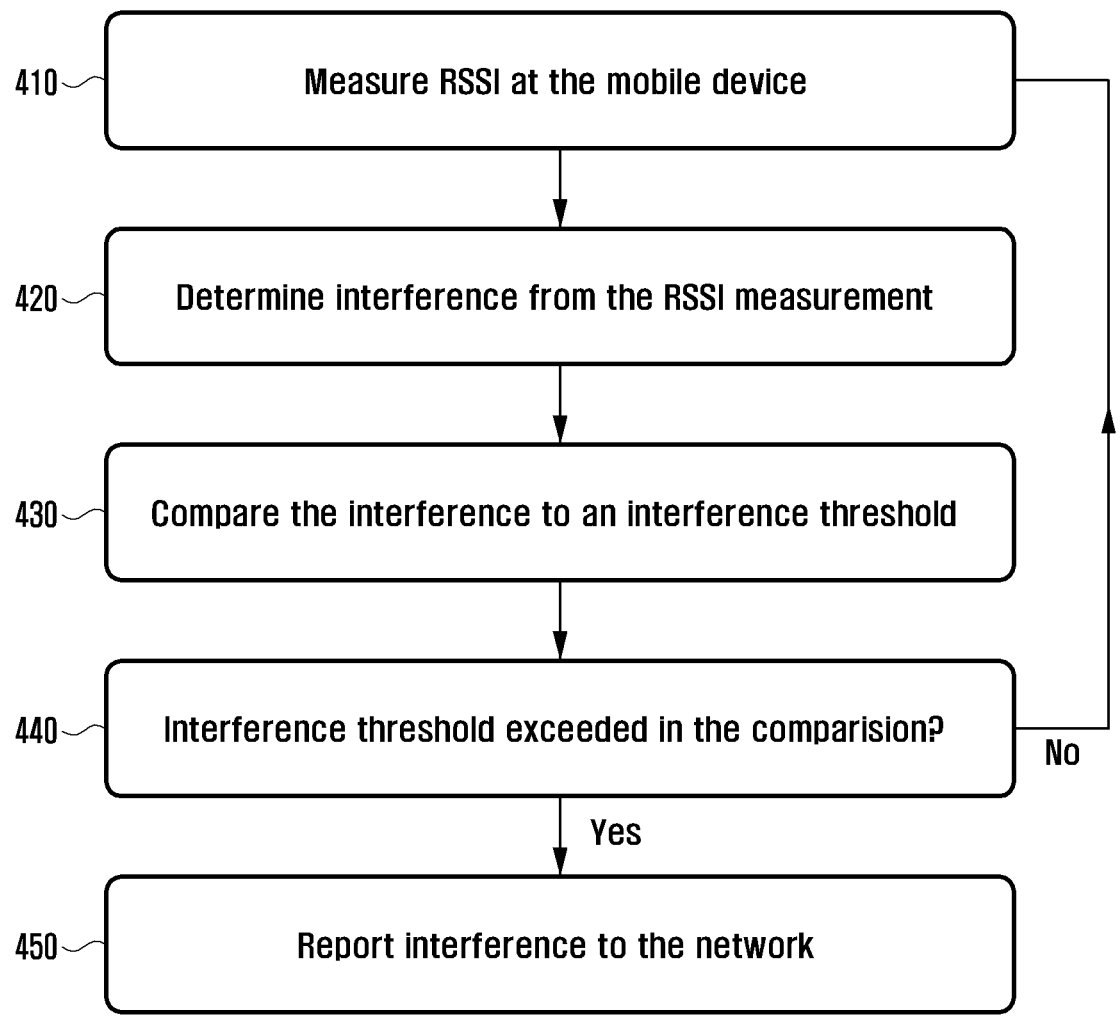
FIG. 5 shows another method in accordance with a further embodiment of the present invention.

Determining whether to report the measured interference may be achieved through a number of different methods. One such method is illustrated in FIG. 5, which illustrates a method in accordance with a further embodiment the present invention. It will therefore be appreciated that FIG. 5 corresponds to embodiments of the present invention where a report is not always sent to the network. However, the skilled person will readily understand how such embodiments could be adapted to relate to other embodiments where every measurement is reported a manner such as—but not limited to—those which have been described.

In FIG. 5, steps 410 and 420 essentially describe similar processes to step 310 of FIG. 4. That is, the mobile device 202 measures or otherwise determines interference using, in the specific case of FIG. 5, an RSSI measurement.

The RSSI measurement may be performed according to different methods. It will be appreciated that some methods may be more suitable than others depending on the configuration of the network or the specific circumstances at hand.

For example, a first option for the RSSI measurement is to perform a single, 'one shot' measurement for a period of N consecutive time units. A time unit corresponds to the period for which the mobile device 202 determines an individual RSSI value. A time unit may be defined in an arbitrary way, for instance to have a value of 4 ms. Alternatively, the time unit may be linked to a network property such as the maximum transmission duration or the LBT estimation duration. A period of N consecutive time units may then correspond to a time period of, for example, 640 ms, indicating that N=160 (160 consecutive RSSI measurements performed by the mobile device 202, each associated with a certain time slot).

A second option is for the mobile device 202 to periodically measure the RSSI for one or more time units. For example, every 160 ms the mobile device 202 may measure one or more time units of 4 ms (to use the values of the first option). This option may be useful if the method for measuring interference involves the use of some hardware or internal component of the mobile device 202 (for example, a receiver) which also needs to be used by the mobile device 202 for other operations (for example, on-going communications). It will be appreciated that the use of the hardware over a number of consecutive time slots (that is, essentially constant use for a period of time) could impact the performance these other operations. Periodically measuring the RSSI according to the second option may mitigate this issue.

In step 430, the determined interference is compared to an interference threshold. The interference threshold may represent a predetermined value stored in the mobile device 202 which is set according to expected levels of interference. That is, the interference threshold is set such that determining a level of interference which is similar to that of typical background levels (that is, deemed negligible) will be discounted. It will be appreciated that the comparison may be between the interference threshold and a single RSSI measurement from a given point in time. Alternatively, the comparison may be between the interference threshold and a number of RSSI measurements taken for a specific time period, where the RSSI measurements may be filtered or averaged in some manner.

In step 440, a check is made as to whether the comparison indicates that the determined interference exceeds an interference threshold.

If the interference threshold is not exceeded, the method may reset to step 410 and the mobile device 202 will perform another RSSI measurement to once again determine interference. Alternatively, the method may simply terminate there—for example it may be concluded that there are no hidden nodes on the frequency channel used by the mobile device 202 and the base station 204.

If the interference threshold is exceeded, the method proceeds to step 450 where the interference is reported to the network 200. Upon reporting the interference, the method may end or reset to step 410 to perform a new RSSI measurement to determine interference.

As an alternative to comparing determined interference to an interference threshold in step 430, instead the determined interference may be compared to a previous interference measurement. The result of this comparison could then be used, in an alternative step 440, to determine whether to report the measured interference. For example, if it is determined that the measured interference is different to the previous interference measurement, then the mobile device 202 may determine to report this interference measurement to the network 200.

As yet another alternative, the comparison with the interference threshold may be used to grade each interference measurement, for example based on whether each measurement is less than or greater than (or equal to) the interference threshold. Then, the graded result for each measurement could be compared to the graded result for the preceding measurement, and if the result has changed then it is determined to report to the network 200.

Steps 440 and 450 may be implemented differently if it is intended that the mobile device 202 always determines to report measured interference. For example, the check may still be made as to whether or not the comparison indicates that the determined interference exceeds the interference threshold. However, the outcome of this check is to assign a predetermined indicator to each measurement; where the predetermined indicator may be one of two values used to indicate that the measured interference is greater than or equal to the threshold or that the measured interference is less than the threshold. Here, the reporting may be to report the indicators assigned to each measurement along with an indication of the time of the measurement.

The steps of comparing the interference to the interference threshold and reporting interference may be performed after every RSSI measurement, or can be performed once a number of RSSI measurements have been taken. For example, the first option mentioned above describes performing the measurement for a number of consecutive time units. After a measurement for an individual time unit, steps 430 to 450 may be performed to inform the network 200 that interference above threshold is detected. Alternatively, the mobile device 202 may measure RSSI for all of the consecutive time periods before reporting to the network 200 any interference. As another alternative, steps 430 to 450 may be performed at some point prior to the end of the time period comprising N consecutive time slots. Similar considerations could be made for the second option outlined above.

In certain embodiments, for both of the first measurement option and the second measurement option it is expected that all time slots (or periods comprising several time slots) where interference is detected to be above threshold will be reported. As indicated above, some accumulation of results may be beneficial. For example, for the second option where a measurement is made every 160 ms, the mobile device 202 may allow 640 ms of measurements to accrue before reporting any interference which occurred in this time.

It is described above that the reported interference includes an indication of the time at which the interference occurs. It will be appreciated that this may be achieved in many ways, of which several shall now be described. In the following, reference is made to FIG. 6 which shows example interference measurements against the corresponding time at which they were measured (for example: consecutive 4 ms time slots; or consecutive 160 ms time periods each comprising one 4 ms time slot). For the purposes of FIG. 6, the interference threshold may be assumed to be set at a value of 3. In this example, the mobile device 202 will therefore determine to report interference for the occasions when the measured interference is equal to or greater than 3.

A first example method of reporting interference involves reporting the amount (for example, the percentage) of time for which the mobile device 202 determined that the measured interference should be reported (for example due to being equal to or greater than the interference threshold). Based on the example shown in FIG. 6, the mobile device 202 may then transmit to the network 200 (for example, the base station 202) an indication that measured interference exceeded the interference threshold for 50% of the time (that is, five different measurements out of the total ten that were performed).

A second example method of reporting interference involves indicating the specific times when the mobile device 202 determines to report the measured interference (for example, due to being equal to or greater than the interference threshold). It will be appreciated that this could be achieved in a number of ways. For instance, the mobile device 202 could report each relevant individual time, and so indicate, for example, times 2, 3, 6, 7 and 8 to the network 200. Alternatively, the mobile device 202 may report the relevant start and end times, and so indicate, for example, times 2 to 3 and times 6 to 8. An another alternative, the mobile device 202 may report when the times when the situation changes, and so indicate, for example, that time 2 is 'above', time 4 is 'below', time 6 is 'above' and time 9 is 'below' (for example, refer to the alternative implementation of step 430 described above). It will be understood that different reporting methods may be more suitable in different situations.

In some of the methods described above, reporting has entailed indicating that the measured interference is found to be greater than or equal to the threshold for a given time or range of times. As described above, it will be appreciated that more detailed information about the measured interference could be indicated in the reporting instead of, for example, simply providing a certain predetermined indicator which has been assigned to the interference measurement(s). For example, a precise degree by which the interference threshold is exceeded could be included, or alternatively the actual measurement itself. However, embodiments have also been described where, instead of simply reporting the times when it was conditionally determined to report the measured interference (for example based on a comparison to an interference threshold), the mobile device 202 is configured to report all interference measurements to the network 200. These embodiments may also involve, for example, reporting detailed information about each measurement (and so may not require comparisons with an interference threshold) or an indication of the result of each measurement (such as by using the above-described predetermined indicators which are assigned according to comparisons with an interference threshold). Further still, for either set of embodiments, additional thresholds could be implemented or made available for use in the mobile device 202, such that the mobile device could dynamically select an interference threshold to use according to certain situations. For example, there may be specific occasions when a greater than normal level of interference is expected at the mobile device 202. In this situation, an interference threshold which is used at other occasions may result in far too many interference measurements being deemed worthy of reporting to the network 200, whereas this is simply an expected consequence of the specific occasion. This potentially false reporting would be inefficient; for example increasing signaling overhead. The appropriate use of different interference thresholds could prevent or at least mitigate this issue.

The above has been concerned with the mobile device 202 reporting the times, time slots, time periods etc. when it has been determined to report the measured interference to the network 200. In the following, it will be advantageous to consider that reporting to the network 200 has actually involved reporting to the base station 204. In certain embodiments, the base station 204 may be aware of the times for which the mobile device 202 performed the measurements. That is, the base station 204 may be aware of the start and end time of the period in which the mobile device 202 performed measurements for N consecutive time slots, or the start and end times of the time slot measurements occurring in periodically.

In view of this, in certain embodiments of the present invention the base station 204 may also have measured interference. Upon receiving the report from the mobile device 202, the base station 204 may therefore check the times indicated by the mobile device against interference measured by the base station 204 at the same times. It may be assumed that the base station 204 has knowledge of the interference threshold such that it has an indication as to the magnitude of interference measured at the mobile device for the relevant time(s). The base station 204 may therefore check whether or not it experienced or measured a similar level of interference at the times which the mobile device 202 found necessary to report. For example, with reference to FIG. 6, the base station 204 may determine that it measured interference at time 3 to be at some value above the interference threshold (or simply above the interference threshold, if this is all that is reported by the mobile device 202). As another example, the mobile device 202 may indicate a specific time slot to the base station 204, where the base station 204 had not measured interference to be above the threshold for that specific time slot. That is, if an interference threshold of 3 is assumed then, based on the example shown in FIG. 3, the mobile device 202 would indicate time slot 4 to the base station 204, thereby informing the base station 204 of a time of high interference which the base station 204 would otherwise not be aware of.

In certain embodiments, the reporting by the mobile device 202 may be such that, for the specific time, the base station 204 may more precisely determine the relationship between the measured interference of the base station 204 and the measured interference of the mobile device 202.

To give a further example, consider the first option for reporting described above, where the mobile device 202 reports to the base station 204 a percentage which indicates the amount of time (or number of time slots) that the measured interference was equal to or above the interference threshold. Upon receiving this information, the base station 204 can compare this percentage against a similar percentage computed by the base station 204 itself. If there is a difference between the two percentages, the base station may determine whether or not this difference is significant. The skilled person will appreciate that determining significance may depend on a number of factors. For instance, as mentioned above there may be occasions where additional interference is expected and so knowledge of these occasions could be used to determine whether or not a difference (relating to measurements made during one of these occasions) is significant. On the basis of these checks performed by the base station 204, an inference can be made as to whether or not a hidden node 208 exists in the network. If the base station 204 concludes that such a hidden node 208 exists, then the base station 204 may take action accordingly.

Figure 7:
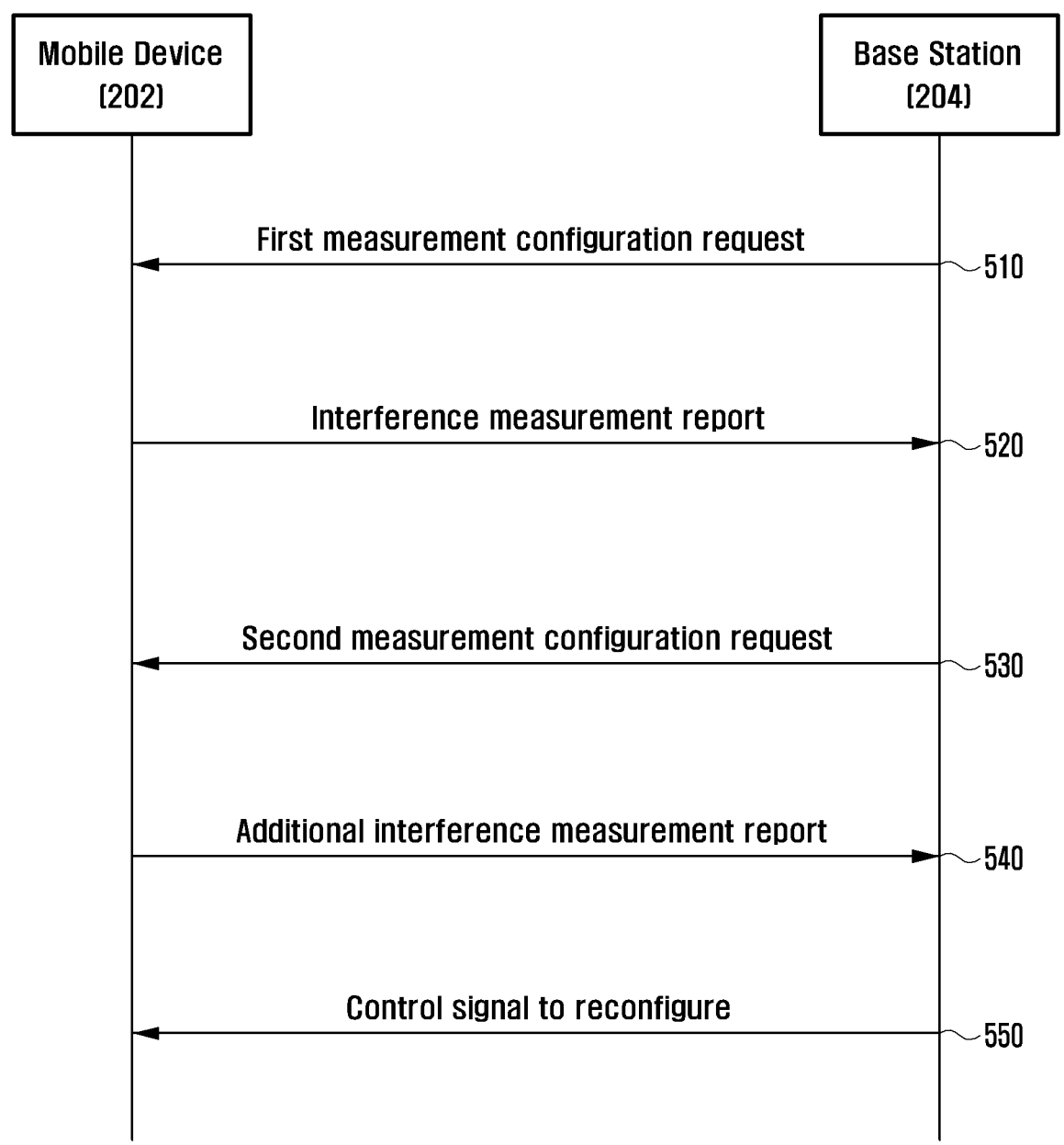
FIG. 7 illustrates messaging between different components of a mobile communication network in accordance with an embodiment of the present invention.

Alternatively, if the received percentage leads the base station 204 to believe that a hidden node 208 exists (for example, by determining the difference to be significant), then the base station may request the mobile device 202 to provide additional measurement information. This request for additional information, which can also be considered a measurement configuration request, is illustrated by step 530 of FIG. 7. For example, the request may be to provide additional measurement information about the measured interference reported by the mobile device 202. As such, the additional measurement information may comprise more precise indications of the relevant time slots for which measured interference was equal to or above the interference threshold. To achieve this, the mobile device 202 may further be configured to store each interference measurement and relevant associated information (for example, a corresponding time slot) in case more detailed information is requested later. Furthermore, the mobile device 202 may be requested to provide, as the additional measurement information, the actual measured interference per individual time slot (this may be, for example, only for the time slots where interference was equal to or above the interference threshold, all time slots where interference was measured, or ever some specific subset of time slots where interference was measured. Alternatively, the request to provide additional measurement information may be a request for the mobile device 202 to perform additional measuring of interference.

Here, the mobile device 202 may perform an additional measurement of interference, determine whether to report the additional measured interference, and report the additional measured interference in a manner similar to previously described. This reporting of the additional measured interference, or additional interference measurement report, is illustrated by step 540 of FIG. 7. Upon receiving a report of the additional measured interference, the base station 204 may then compare this report to additional interference measurements made by the base station 204 (for time slots which correspond to those that the mobile device 202 has made additional interference measurements for). Based on this second comparison, the base station 204 may determine to reconfigure the network. In certain embodiments, the base station 204 instructs, in the request to provide additional measurement information, the mobile device to perform at least one of the interference measuring, the determining to report the measured interference, and the reporting of the measured interference in a manner different to that previously performed by the mobile device 202. For example, the base station 204 may request that the mobile device 202 performs a different type of measurement or specifies a different time slot, or may request that the mobile device 202 reports every measurement instead of those which exceed a threshold (assuming such was used previously), or that the mobile device includes more-specific time slot information when reporting the measured interference.

In certain embodiments, if the base station 204 determines the existence of a hidden node 208, the base station 204 may determine to reconfigure the wireless communication network. This reconfiguring may be intended to remove or mitigate the interference caused by the hidden node 208.

For example, in certain embodiments of the present invention the base station 204, upon determining the existence of a hidden node 208, may switch to another LAA channel (having another frequency) where its communications with the mobile device 202 will not collide or otherwise suffer interference from those of the hidden node 208. Here, the base station 204 may choose an LAA channel to move the mobile device 202 to by first verifying that there are no hidden nodes on the chosen LAA channel. To achieve this switching, in certain embodiments the base station 204 may transmit a control signal to the mobile device 202 to inform the mobile device of the change in channel. This control signal transmission is illustrated by step 550 of FIG. 7.

In another embodiment, the base station 204 may attempt to identify the hidden node 208, for example by using timing information and/or physical identity. For example, in an LAA system the DRS (and so the physical cell ID, PCID) of the hidden node may be detected. Furthermore, in a WLAN, if the mobile device 202 can decode the 802.11 preamble then the mobile device 202 could identify the cell identity. The mobile device 202 could then report this information if necessary (for example, to an AP). This identification could then allow the base station 204 to contact the hidden node 208 by some appropriate means and coordinate transmissions with the hidden node 208 to mitigate interference.

It will be appreciated that these actions performed, in certain embodiments, by the base station 204 (or network 200) may also be performed as part of certain embodiments described above with regards to FIG. 4.

Additionally, as may be evident from the above description of FIG. 4, in certain embodiments the method of FIG. 5 may further include an earlier step whereby the mobile device 202 receives, from the base station 204, a request for measuring interference. The transmission of this request, or measurement configuration request, is illustrated by step 510 in FIG. 7. It will be appreciated that this request may further include configuration information, which may, for example, indicate that the mobile device 202 should achieve the interference measuring using an RSSI measurement—as is then performed in step 410 of FIG. 5. The provision of a report of measured interference, or an interference measurement report, is illustrated by step 520 of FIG. 7.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method performed by a terminal in a wireless communication system, the method comprising:
    receiving, from a base station, a first message including first information configuring a timing for a measurement of a received signal strength indicator (RSSI) and second information configuring a report of the RSSI, the second information further including information on a threshold for the measurement of the RSSI;
    performing the measurement of the RSSI during the timing determined by the first information;
    identifying a percentage of samples for which a measured RSSI is above the threshold based on the information on the threshold included in the second information;
    transmitting, to the base station, a result of the measurement of the RSSI based on the second information, the result including the percentage of samples, a specific time of which the measured RSSI is above the threshold, and an indicator indicating an interference level which is a quantization of the measured RSSI;
    receiving, from the base station, a second message requesting additional measurement information, wherein the second message is generated based on a determination that a hidden node exists within a communication range of the terminal and outside a communication range of the base station, by comparing the result of the measurement with an interference measured by the base station; and
    transmitting, to the base station, a report of an additional interference measurement result per each time slot for which the measured RSSI is above the threshold, the additional interference measurement result including an actual measured interference value for a corresponding time slot.

2. The method of claim 1, wherein the first information further includes information on a duration of the timing.

3. The method of claim 1, wherein an interference is measured in an unlicensed band based on the RSSI.

4. A terminal in a wireless communication system, the terminal comprising:
    a transceiver configured to transmit and receive signals; and
    a controller configured to:
        receive, via the transceiver from a base station, a first message including first information configuring a timing for a measurement of a received signal strength indicator (RSSI) and second information configuring a report of the RSSI, the second information further including information on a threshold for the measurement of the RSSI,
        perform, via the transceiver, the measurement of the RSSI during the timing determined by the first information,
        identify a percentage of samples for which a measured RSSI is above the threshold based on the information on the threshold included in the second information,
        transmit, via the transceiver to the base station, a result of the measurement of the RSSI based on the second information, the result including the percentage of samples, a specific time of which the measured RSSI is above the threshold, and an indicator indicating an interference level which is a quantization of the measured RSSI,
        receive, from the base station, a second message requesting additional measurement information, wherein the second message is generated based on a determination that a hidden node exists within a communication range of the terminal and outside a communication range of the base station, by comparing the result of the measurement with an interference measured by the base station, and
        transmit, to the base station, a report of an additional interference measurement result per each time slot for which the measured RSSI is above the threshold, the additional interference measurement result including an actual measured interference value for a corresponding time slot.

5. The terminal of claim 4, wherein the first information further includes information on a duration of the timing.

6. The terminal of claim 4, wherein an interference is measured in an unlicensed band based on the RSSI.

7. A method performed by a base station in a wireless communication system, the method comprising:

transmitting, to a terminal, a first message including first information configuring a timing for a measurement of a received signal strength indicator (RSSI) and second information configuring a report of the RSSI, the second information further including information on a threshold for the measurement of the RSSI;

receiving, from the terminal, a result of the measurement of the RSSI based on the second information, the measurement being performed during the timing determined by the first information, wherein a percentage of samples for which a measured RSSI is above the threshold is identified based on the information on the threshold included in the second information, and wherein the result includes the percentage of samples, a specific time of which the measured RSSI is above the threshold, and an indicator indicating an interference level which is a quantization of the measured RSSI; and transmitting, to the terminal, a second message requesting additional measurement information, wherein the second message is generated based on a determination that a hidden node exists within a communication range of the terminal and outside a communication range of the base station, by comparing the result of the measurement with an interference measured by the base station; and receiving, from the terminal, a report of an additional interference measurement result per each time slot for which the measured RSSI is above the threshold, the additional interference measurement result including an actual measured interference value for a corresponding time slot.

8. The method of claim 7, wherein the first information further includes information on a duration of the timing.

9. The method of claim 7, wherein an interference is measured in an unlicensed band based on the RSSI.

10. A base station in a wireless communication system, the base station comprising:
a transceiver configured to transmit and receive signals; and
a controller configured to:
transmit, via the transceiver to a terminal, a first message including first information configuring a timing for a measurement of a received signal strength indicator (RSSI) and second information configuring a report of the RSSI, the second information further including information on a threshold for the measurement of the RSSI, and transmit, via the transceiver from the terminal, a result of the measurement of the RSSI based on the second information, the measurement being performed during the timing determined by the first information, wherein a percentage of samples for which a measured RSSI is above the threshold is identified based on the information on the threshold included in the second information, and wherein the result includes the percentage of samples, a specific time of which the measured RSSI is above the threshold, and an indicator indicating an interference level which is a quantization of the measured RSSI, transmit, via the transceiver to the terminal, a second message requesting additional measurement information, wherein the second message is generated based on a determination that a hidden node exists within a communication range of the terminal and outside a communication range of the base station, by comparing the result of the measurement with an interference measured by the base station, and receive, via the transceiver from the terminal, a report of an additional interference measurement result per each time slot for which the measured RSSI is above the threshold, the additional interference measurement result including an actual measured interference value for a corresponding time slot.

11. The base station of claim 10, wherein the first information further includes information on a duration of the timing.

12. The base station of claim 10, wherein an interference is measured in an unlicensed band based on the RSSI.

* * * * *

UNITED STATES PATENT AND TRADEMARK OFFICE
CERTIFICATE OF CORRECTION

| | |
|---|---|
| PATENT NO. | : 11,153,773 B2 |
| APPLICATION NO. | : 15/565408 |
| DATED | : October 19, 2021 |
| INVENTOR(S) | : Himke Van Der Velde et al. |

It is certified that error appears in the above-identified patent and that said Letters Patent is hereby corrected as shown below:

On the Title Page

Item (30) Foreign Application Priority Data "Jul. 17, 2015 (GB).................1512518" should read -- Jul. 17, 2015 (GB).............1512518.0 --.

Signed and Sealed this
Seventeenth Day of May, 2022

Katherine Kelly Vidal
*Director of the United States Patent and Trademark Office*